(12) United States Patent
Gubbins et al.

(10) Patent No.: US 10,984,821 B1
(45) Date of Patent: *Apr. 20, 2021

(54) TRANSFER-PRINTED NEAR-FIELD TRANSDUCER AND HEAT SINK

(71) Applicant: Seagate Technology LLC, Cupertino, CA (US)

(72) Inventors: Mark Gubbins, Donegal (IE); Roger L. Hipwell, Jr., Eden Prairie, MN (US); Marcus B. Mooney, Donegal (IE); Mark Ostrowski, Lakeville, MN (US); Tong Zhao, Eden Prairie, MN (US); Michael J. Hardy, Maghera (GB); Michael Christopher Kautzky, Eagan, MN (US); Neil Zuckerman, Eden Prairie, MN (US); Declan Macken, Eden Prairie, MN (US); Francis A. McGinnity, Eglinton (IE)

(73) Assignee: Seagate Technology LLC, Fremont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/170,192

(22) Filed: Oct. 25, 2018

Related U.S. Application Data

(62) Division of application No. 14/946,274, filed on Nov. 19, 2015, now abandoned.

(60) Provisional application No. 62/081,765, filed on Nov. 19, 2014.

(51) Int. Cl.
*G11B 5/127* (2006.01)
*G11B 3/10* (2006.01)
*G11B 11/105* (2006.01)
*G11B 5/31* (2006.01)
*G11B 5/00* (2006.01)

(52) U.S. Cl.
CPC .............. *G11B 5/1272* (2013.01); *G11B 3/10* (2013.01); *G11B 5/3133* (2013.01); *G11B 11/1055* (2013.01); *G11B 2005/0021* (2013.01)

(58) Field of Classification Search
CPC ..... G11B 3/10; G11B 11/1055; G11B 5/3133; G11B 5/3967; G11B 5/1272
USPC ........................................ 216/22, 40, 54, 56
See application file for complete search history.

(56) References Cited

U.S. PATENT DOCUMENTS

| | | | |
|---|---|---|---|
| 6,294,450 B1 | 9/2001 | Chen et al. | |
| 7,622,367 B1 | 11/2009 | Nuzzo et al. | |
| 7,972,875 B2 | 7/2011 | Rogers et al. | |
| 7,998,330 B2 | 8/2011 | Fang et al. | |
| 8,261,660 B2* | 9/2012 | Menard .................. | H01L 24/74 101/109 |
| 8,333,860 B1 | 12/2012 | Bibl et al. | |
| 8,456,969 B1 | 6/2013 | Mooney et al. | |
| 8,501,536 B2 | 8/2013 | Mooney et al. | |
| 8,518,204 B2 | 8/2013 | Hu et al. | |

(Continued)

OTHER PUBLICATIONS

Kim et al., "Printable, Flexible, and Stretchable Forms of Ultrananocrystalline Diamond with Applications in Thermal Management", Advanced Materials, vol. 20, 2008, pp. 2171-2176.

(Continued)

*Primary Examiner* — Binh X Tran
(74) *Attorney, Agent, or Firm* — Mueting Raasch Group

(57) ABSTRACT

A near-field transducer or heat sink is formed via a first process. The near-field transducer or heat sink is transfer-printed to a read/write head via a second process.

18 Claims, 6 Drawing Sheets

(56) References Cited

U.S. PATENT DOCUMENTS

| | | | |
|---|---|---|---|
| 8,721,902 B1* | 5/2014 | Wang | G11B 5/314 |
| | | | 216/22 |
| 8,923,098 B2 | 12/2014 | Jin et al. | |
| 8,995,088 B1* | 3/2015 | Boone | G11B 5/3146 |
| | | | 360/125.32 |
| 9,105,286 B2 | 8/2015 | Boone, Jr. | |
| 10,069,029 B1 | 9/2018 | Olson et al. | |
| 2007/0215480 A1 | 9/2007 | Fang et al. | |
| 2009/0217517 A1 | 9/2009 | Pique et al. | |
| 2010/0283069 A1 | 11/2010 | Rogers et al. | |
| 2011/0018158 A1 | 1/2011 | Menard | |
| 2011/0138600 A1 | 6/2011 | Oggioni et al. | |
| 2011/0216635 A1 | 9/2011 | Masumoto | |
| 2012/0084969 A1* | 4/2012 | Tanaka | G11B 5/6088 |
| | | | 29/603.01 |
| 2013/0230071 A1 | 9/2013 | Haensel et al. | |
| 2013/0286799 A1* | 10/2013 | Zhu | G11B 13/08 |
| | | | 369/13.02 |
| 2013/0316487 A1 | 11/2013 | de Graff et al. | |
| 2013/0330853 A1 | 12/2013 | Tischler et al. | |
| 2014/0241137 A1 | 8/2014 | Jin et al. | |
| 2014/0373898 A1 | 12/2014 | Rogers et al. | |
| 2015/0036468 A1 | 2/2015 | Boone, Jr. | |
| 2015/0179204 A1 | 6/2015 | Mosendz et al. | |
| 2016/0118071 A1* | 4/2016 | Hirotsune | G11B 5/65 |
| | | | 360/75 |
| 2016/0195676 A1 | 7/2016 | Yu et al. | |

OTHER PUBLICATIONS

Stadler et al., "Integrated Magneto-Optical Materials and Isolators: A Review", IEEE Phototonics Journal, 2013, 16 pages.
File History for U.S. Appl. No. 16/263,608.

* cited by examiner

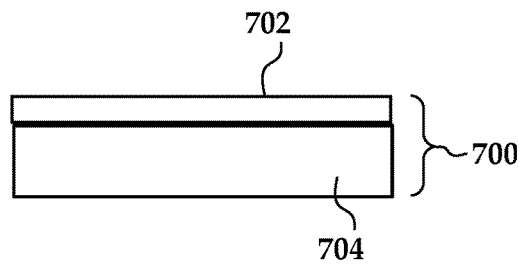
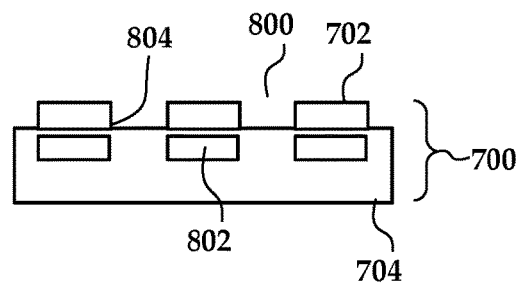
FIG. 7  FIG. 8
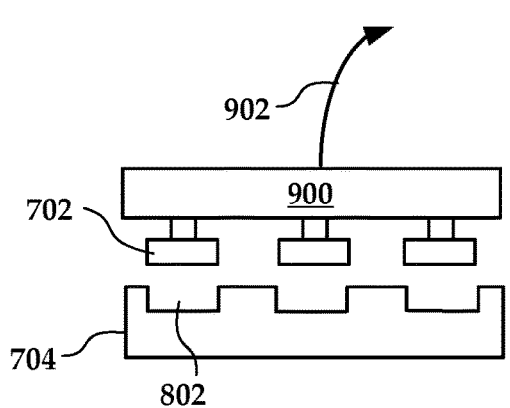
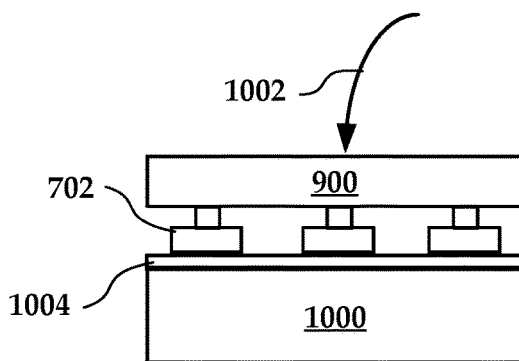
FIG. 9  FIG. 10
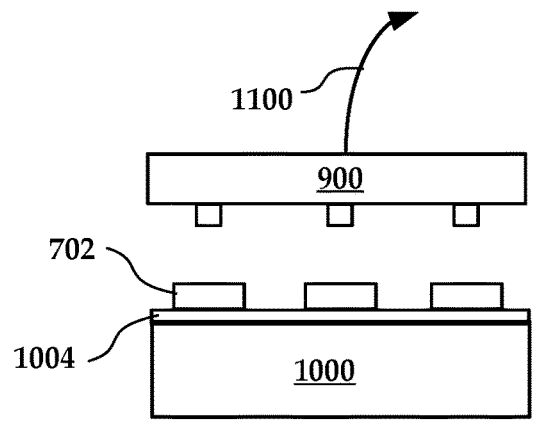
FIG. 11

TRANSFER-PRINTED NEAR-FIELD TRANSDUCER AND HEAT SINK

RELATED PATENT DOCUMENTS

This application is a divisional of U.S. patent application Ser. No. 14/946,274 filed on Nov. 19, 2015, which claims the benefit of Provisional Patent Application Ser. No. 62/081,765 filed on Nov. 19, 2014, all of which are incorporated herein by reference in their entireties.

SUMMARY

The present disclosure is related to transfer printing of a near-field transducer and/or a heat sink. In one embodiment, a near-field transducer or heat sink is formed via a first process. The near-field transducer or heat sink is transfer-printed to a read/write head via a second process. In another embodiment a material stack is created on a donor substrate. The material stack has at least two of a material layer, an adhesion layer, a protection layer, a carrier layer, a bonding layer, and planarization stop material layer. Islands are formed from the material stack, the islands being used to form a plurality of read/write head components. The islands are transfer-printed to a wafer having a plurality of read/write heads.

These and other features and aspects of various embodiments may be understood in view of the following detailed discussion and accompanying drawings.

BRIEF DESCRIPTION OF THE DRAWINGS

In the following diagrams, the same reference numbers may be used to identify similar/same/analogous components in multiple figures. The figures are not necessarily to scale.

FIGS. 7-11 are diagrams illustrating a transfer printing process according to another example embodiment;

DETAILED DESCRIPTION

Figure 1:
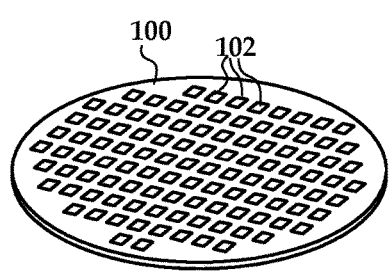
FIGS. 1-5 are diagrams showing a transfer printing process according to an example embodiment.

In the following description, reference is made to the accompanying set of drawings that form a part of the description hereof and in which are shown by way of illustration of several specific embodiments. It is to be understood that other embodiments are contemplated and may be made without departing from the scope of the present invention. The following detailed description, therefore, is not to be taken in a limiting sense.

This disclosure relates to read/write heads used in heat-assisted magnetic recording (HAMR), also referred to as thermally-assisted recording (TAR), thermally-assisted magnetic recording (TAMR), energy-assisted magnetic recording (EAMR), etc. In this disclosure the terms "read/write head," "slider," "recording head", and "head" will be used interchangeably. In a HAMR device, a read/write head includes an energy source (e.g., a laser diode) that heats a recording medium during writing. The HAMR read/write head generally includes some form of optical transmission path, such as a waveguide and near-field transducer (NFT), which shapes and directs the energy from the energy source to the recording medium.

One issue that this disclosure addresses is that the NFT used in HAMR gets extremely hot, which often limits the lifetime of the HAMR read/write head. Material choices and preparation for NFT elements needs to conform to the process temperatures and grain structure of the AlTiC substrate, reader stack, writer elements and other elements of the read/write heads. This may limit the material choices that can last the longest under the thermal stress of HAMR. This disclosure describes how transfer printing may enable new material options for high-reliability and/or performance near-field transducers. Transfer printing generally involves transferring non-self-supporting, growth-incompatible layers to a substrate, and be referred to as transfer printing, dry transfer printing, nanoprinting, etc. The transfer printing of the NFT allows the use of high-performance materials that might not otherwise be deposited on the slider substrate. This is similar to methods enabling on-wafer lasers (OWL). This process can also be used for other components subject to high temperatures and/or other stresses (e.g., impact with a recording medium), such as heat sinks, air-bearing features, etc.

In the present disclosure, hard drive recording heads are proposed onto which a crystalline structure (e.g., near-field transducer, heat sink) is attached without the use of a separate or intermediate support during attachment. Such crystalline structures are incompatible with growth on the substrate. As such, the device cannot be formed using the same layer deposition processes used to form the magnetic and optical components that are integrated into the head. In embodiments described below, a near-field transducer may instead be formed on the substrate by transfer printing a thin, non-self-supporting crystalline layer, or a stack of such layers, from a growth substrate on which they were formed to a target substrate. Thereafter, the crystalline layer and substrate may be further processed (e.g., masked etched, further layers added) to form the rest of the recording head.

Near field transducers are expected to have improved reliability for HAMR when the number of defects and grain boundaries are reduced in the transducer material. Depositing a fully crystalline transducer on a crystalline substrate would allow this high quality material to be achieved. However, direct growth of this fully crystalline material is not feasible on a recording head with polycrystalline and amorphous materials. Growing crystalline material on crystalline substrate and subsequent transfer to the recording head using transfer printing allows this material type to be achieved in a recording head.

In FIGS. 1-5, block diagrams illustrate transfer printing of components onto a recording head according to an example embodiment. In FIG. 1, a donor substrate 100 includes a number of components 102 (e.g., NFTs, heat sinks) formed using a first process (e.g., crystalline growth). The components 102 may include one or more layers of materials that have been processed via photolithography and/or other processes to attain a final shape and position on the substrate 100. A sacrificial layer may also be included between the components 102 and the substrate 100 to allow separation. This fabrication could include some or all of the following: NFT (plasmonic) material, adhesion or protection layers, carrier layers (to increase thickness for easier transport), bonding layers to aid in best print transfer, and integration layers to enable subsequent integration (e.g., stop material to allow planarization after integration).

Figure 2:
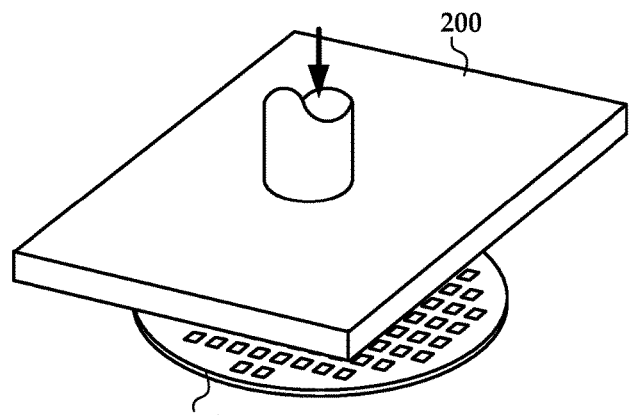
Figure 3:
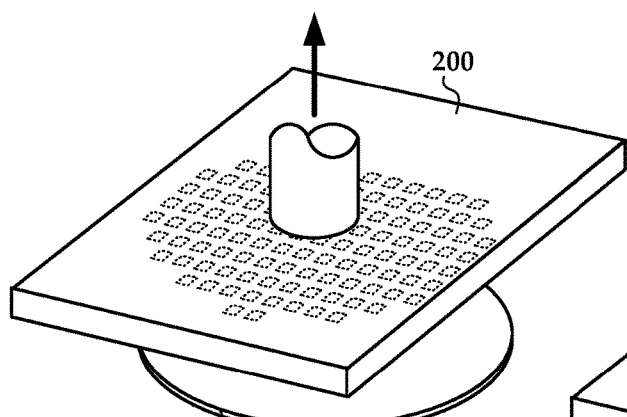

As seen in FIG. 2, a transfer print head 200 is lowered onto the substrate material (or material stack) onto a target substrate (typically of a different material). The transfer print head 200 is lifted as shown in FIG. 3, taking the components 102 with it. In this way, "islands" of the component material are then transferred to a target substrate 400 as shown in FIGS. 4-5.

Figure 4:
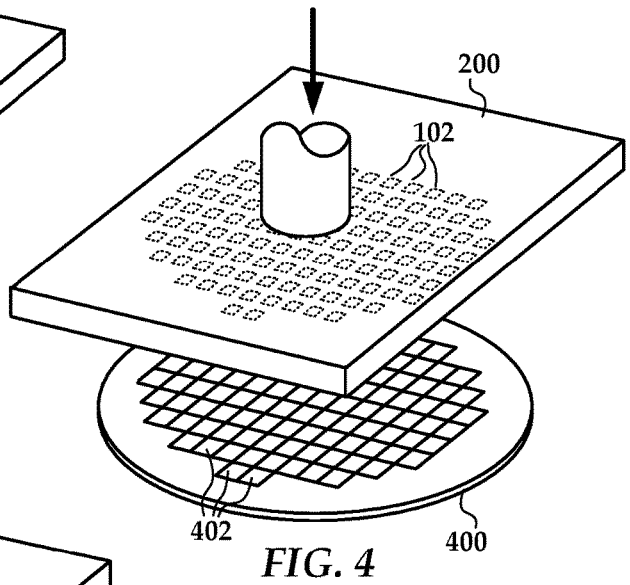
Figure 5:
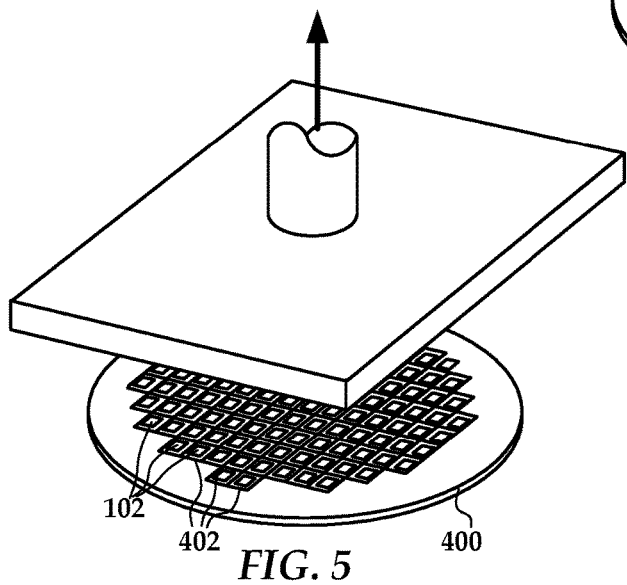
Figure 6A:
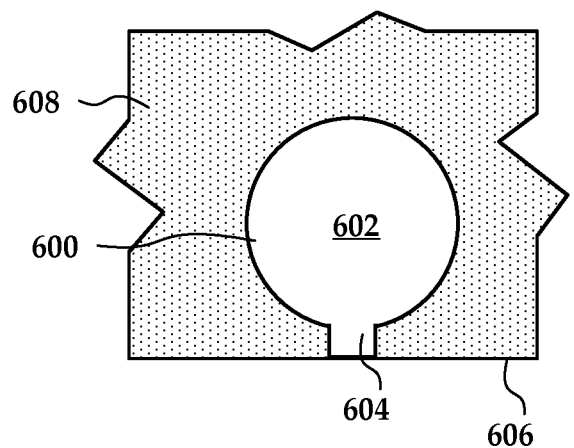
FIG. 6A is a block diagram showing a transfer printed near-field transducer according to an example embodiment.

As seen in FIG. 4, the transfer print head 200 is lowered over a wafer 400 that includes a number of partially-processed recording heads 402. The transfer print head 200 presses the components 102 on to the wafer 400 and is then pulled away as seen in FIG. 5. This attaches the components 102 to the recording heads 402. Afterwards, the wafer 400 is further processed, e.g., etching the components 102 to final shape and alignment, and adding additional layers of material to form additional recording head components. An example of an NFT that may be attached to a recording head is shown in FIG. 6A. An NFT 600 includes a disc 602 and peg 604 that extends to a media-facing surface 606 of a recording head 608.

Figure 6B:
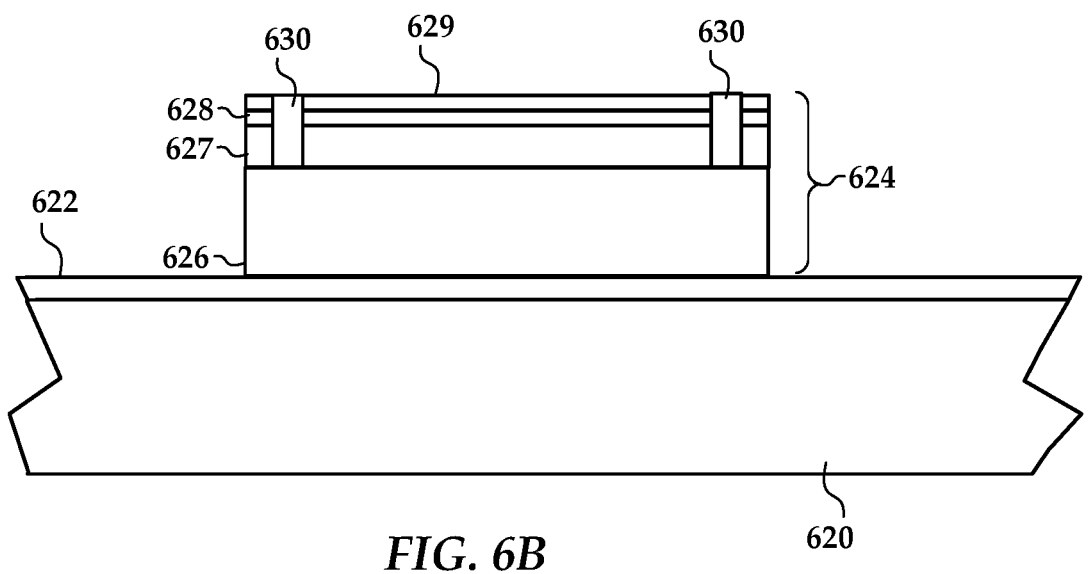
FIG. 6B is side view of a material stack used to form a component according to an example embodiment.

As previously noted, the components 102 and donor substrate 100 may include a number of layers. In FIG. 6B, a block diagram illustrates layers of a donor substrate 620 and associated components according to an example embodiment. A sacrificial layer 622 is between the substrate 620 and a transfer-print component 624 and facilitates separation under some condition (e.g., temperature, electrical charge, etc. The component 624 includes a carrier layer 626 (e.g., to increase thickness for easier transport after separation from the sacrificial layer 622), a material layer 627 (e.g., with plasmonic material, heat sink material, etc.), adhesion or protection layers 628, a bonding layer 629 to aid in best print transfer, and integration layers/features 630 to enable subsequent integration (e.g., stop material to allow planarization after integration).

It will be understood that any combination of the layers 626-630 may be used, such at least one of the layers is the material layer 627. The component 624 may be shaped and/or aligned (e.g., via etching) on the donor substrate 620. For example, the component 624 may be formed as an island after depositing layers 626-630 over the entire substrate 620. The component 624 may also be shaped and/or aligned (e.g., via etching) after transfer to a read/write head. The component 624 may include multiple functional components, e.g., including both a plasmonic NFT and a non-plasmonic heat sink.

The transfer printing described above allows batch transfer "islands" of preferred NFT material that couldn't be formed on the target AlTiC read/write head substrate (e.g., due to temperature or crystal structure limitations). This enables a wide range of potential material choices that might create optimal near-field transducer performance or lifetime beyond current prior art. The NFT material layers can be integrated into a HAMR head at a wafer level. The transferred material serves as the near-field transducer material (e.g., photo-patterned and etched to form the desired structure). Carrier layers can then be sacrificed (e.g., removed after transferring to target substrate). The material layers may include multiple layers to enhance bonding, adhesion, or optimize reliability in addition to primary NFT material, integration with other layers in the head, thermal conduction, optical enhancement/coupling, etc. This process may be used to form an NFT with high performance materials that can't be formed/annealed adequately on conventional read/write head wafers.

In one embodiment, the process may be used to form an NFT from single crystal Au using high temperature deposition. The NFT can have tailored properties such as high density, grain boundary diffusion, better thermal and optical conductivity, etc. The process may be used to form plasmonic nanorods, with our without a core/shell structure. The process may be used to form an NFT using high temperature processing of plasmonic oxides, nitrides, graphene, and any other plasmonic material that requires high-temperature deposition for optical and/or thermal conductivity and/or mechanical benefits.

The use of NFT transfer printing expands both material and process possibilities. For example, high-temperature options beyond deposition temperature may be used to form an NFT, such as rapid thermal anneal spike annealing, laser annealing, current-induced heating. Such processes provide potential gains in (a) NFT metal densification (b) peg-clad interface reactions or (c) intermetallic formation (plasmonic or adhesion-promoting. Very high index waveguide materials (e.g., GaP, n~3.2, high-n complex oxides) are enabled by epitaxial growth at high temperature.

In FIGS. 7-11, block diagrams illustrate details of a transfer printing process according to another example embodiment. The side view of FIG. 7 shows a template wafer 700 with a plasmonic material layer 702 deposited on a second layer 704 (e.g., adhesion layer, protection layer, carrier layer, bonding layer, and chemical mechanical planarization stop material layer). In an example implementation, the plasmonic material layer 702 is deposited on a second layer 704 at a temperature that exceeds that which the reader will tolerate (e.g., 220 degrees Celsius). The relatively thick second layer 704 provides a surface on which the plasmonic material layer 702 may be deposited and facilitates transportation of the relatively thin plasmonic material layer 702 without damaging the plasmonic material layer 702. Further, the plasmonic material layer 702 may be deposited on a template substrate 704 at a relatively high temperature (e.g., up to 700 Celsius) that may damage other magnetic components of a recording head wafer (see recording head wafer 1000 of FIG. 10) if applied directly to the recording head wafer.

The side view of FIG. 8 the template wafer 700 of FIG. 7 with the plasmonic material layer 702 patterned into islands with etched voids underneath. In one implementation, etching streets (e.g., etching street 800) are patterned (e.g., using photolithography) in a continuous or non-continuous grid pattern in the plasmonic material layer 702, which forms the islands. Further, a majority of the second layer 704 is etched away immediately underneath each of the islands using the etching streets as access to the underside of the islands. The etching creates the etched voids (e.g., void 802) underneath the islands. Some of the template substrate 704 immediately underneath each of the islands may remain to keep the islands in place. This remaining material may be referred to as an anchor tab(s) (e.g., anchor tab 804). In other implementations, a release layer oriented between the plasmonic material layer 702 and the second layer 704 is used in addition or in lieu of to the patterning and/or etching illustrated in FIG. 8.

In FIG. 9, a side view illustrates a flexible stamp 900 attached to and pulling the individual islands of the plasmonic material layer 702 away from the template substrate 704 of FIG. 8. The flexible stamp 900 is loosely bonded (e.g., via a light adhesive or a release layer (not shown)) that allows it to be removably attached to the individual islands of the plasmonic material layer 702. The stamp 900 lifts the individual islands of the plasmonic material layer 702 from the template substrate 704, as illustrated by arrow 902.

The etched voids facilitate the removal of the individual islands of the plasmonic material layer 702 from the template wafer 700 by providing very little of the template substrate 704 remaining immediately beneath each of the individual islands of the plasmonic material layer 702. In one implementation, a separation force is applied to the stamp 900 and the template substrate 704, which is sufficient to break the anchor tab(s) connecting the individual islands of the plasmonic material layer 702 to the template substrate 704. However, the separation force is insufficient to remove the individual islands of the plasmonic material layer 702 from the stamp 900.

In FIG. 10, a side view illustrates the flexible stamp 900 placing the individual islands of the plasmonic material layer 702 of FIG. 9 onto a recording head wafer 1000, as illustrated by arrow 1002. The plasmonic material layer 702 islands are then bonded or stamped to the recording head wafer 1000. For example, the recording head wafer 1000 may include an adhesive layer 1004 that bonds the plasmonic material layer 702 islands to the recording head wafer 1000 on contact, with the application of pressure, and/or with the application of an elevated temperature. In other implementations, the plasmonic material layer 702 islands are directly bonded to the recording head wafer 1000 without the adhesive layer 1004. This process may occur at temperatures within that which the reader will tolerate (e.g., less than 220 degrees Celsius).

In FIG. 11, a side view illustrates the individual islands of the plasmonic material layer 702 bonded to the amorphous recording head wafer 1000 of FIG. 10 with the flexible stamp 900 removed, as illustrated by arrow 1100. The flexible stamp 900 is released from the plasmonic material layer 702, which leaves the individual islands for the plasmonic material layer 702 attached to the recording head wafer 1000 via the adhesive layer 1004. In one implementation, a separation force is applied to the stamp 900 and the recording head wafer 1000, which is sufficient to break the bonds connecting the individual islands of the plasmonic material layer 702 to the stamp 900. However, the separation force is insufficient to remove the individual islands of the plasmonic material layer 702 from the recording head wafer 1000.

The technique illustrated by FIGS. 7-11 may be referred to herein as a hybrid pick-and-place bonding technique. In some embodiments, the recording head wafer 1000 may have a significantly different area than the template wafer 700 (e.g., the template wafer may be a 4-inch circular wafer, while the recording head wafer 1000 may be an 8-inch circular wafer). Since the flexible stamp 900 may be used to place the islands of the plasmonic material layer 702 on the recording head wafer 1000 multiple times at different places on the surface of the recording head wafer 1000, the technique illustrated by FIGS. 7-11 may be used with a variety of template and recording head wafer sizes.

Figure 12:
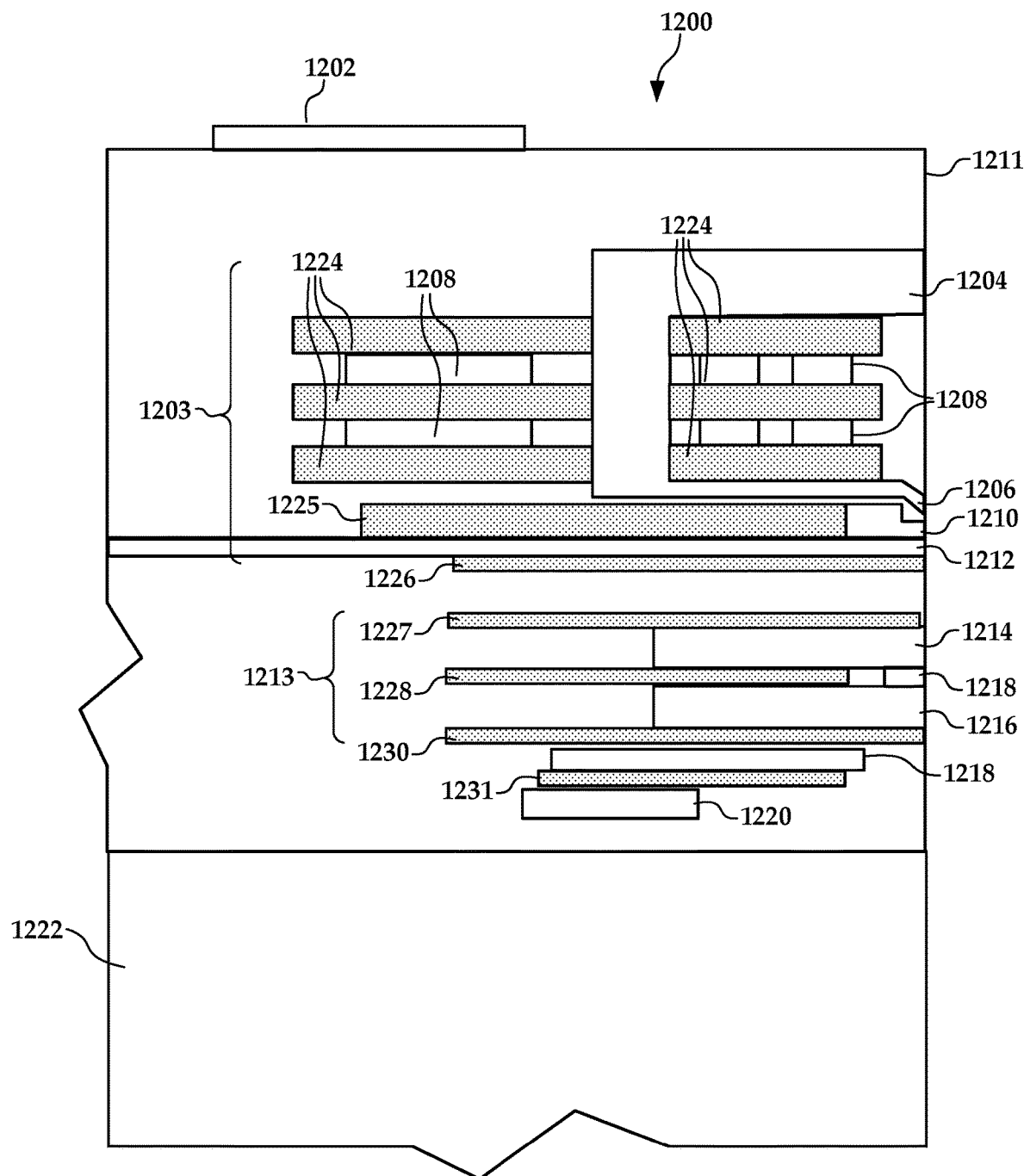
FIGS. 12 and 13 are cross-sectional views showing read/write-head-integrated heat sinks according to example embodiments.

A previously noted, the transfer printing techniques described above may be used for other HAMR recording head components other than an NFT. In FIG. 12, a cross-sectional diagram illustrates transfer-printed heat sink components according to example embodiments. A read/write head 1200 is formed using a combination of photolithographic and transfer printing processes. The read/write head 1200 includes one or more surface-located bond pads 1202 that facilitate electrical communication with components that are integral the read/write head 1200. The read/write head 1200 will include internal conductors (e.g., studs, traces) that couple the bond pads 1202 to these internal components.

A write transducer 1203 of the read/write head includes a return pole 1204 and write pole 1206 that are magnetically activated by a coil 1208. The write transducer also includes an NFT 1210 that shapes and directs surface plasmons out of a media-facing surface 1211 of the read/write head 1200. Optical layers 1212 (e.g., waveguide core and cladding layers) deliver energy to the NFT 1210, the energy originating from a laser or the like (not shown). A read transducer 1213 of the read/write head includes a magnetic sensor 1218 (e.g., magnetoresistive sensor) surrounded by magnetic shields 1214, 1216. A heater 1220 is activated to control clearance of the read and/or write transducers 1203, 1213. A push block 1218 facilitates shaping of protrusion caused by the heater 1220. These components are all built on top of a substrate 1222 that forms a slider body of the read/write head 1300.

As indicated by shaded regions 1224-1231, high thermal conductivity patterned film can be placed within layers of the read/write head 1200 via transfer printing. The regions 1224-1231 may be, e.g., a film of material that has high thermal conductivity while being an electrical insulator, such as diamond, diamond-like carbon, and/or boron nitride. Any combination of the shaded regions may be included in a HAMR read/write head. Regions 1224 are located between coil layers 1208 and magnetic poles 1204, 1206. Region 1225 is located below the write pole 1206 and in contact with the NFT 1210. Regions 1226 is below or adjacent the waveguide 1212. Regions 1227-1230 are located behind the read sensor 1218 and/or in contact with reader shields 1214, 1216. Region 1231 thermally couples the heater 1220 with the push block 1218.

Figure 13:
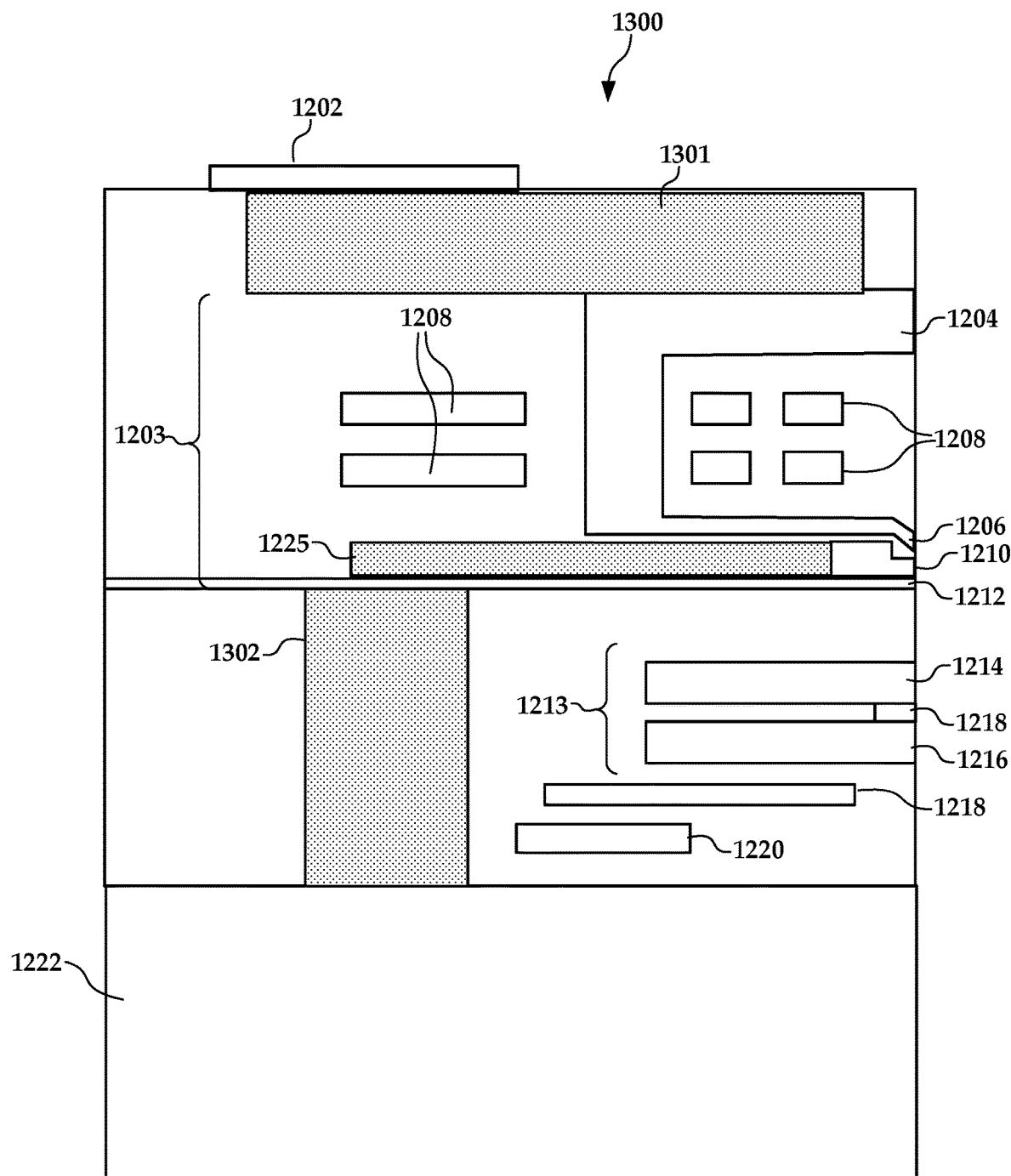

In FIG. 13, a cross-sectional diagram illustrates transfer-printed heat sink components of a read/write head 1300 according to additional embodiments. For purposes of convenience, the non-transfer printed components of the read/write head 1300 are given the same reference numbers as in FIG. 12 (e.g., bond pad 1202, magnetic poles 1204, 1206, etc.), and these components are described above. As indicated by shaded regions 1301-1302, high thermal conductivity patterned film can be transferred within layers of the read/write head 1300 via transfer printing. Region 1301 thermally couples the return pole 1204 to bond pads 1202, which facilitates transferring heat to the external solder bonds (not shown). Region 1302, together with region 1225 that was previously described in FIG. 1225, can couple heat from the writer structures to the substrate 1222.

The process used to create the heat sink regions shown in FIGS. 12 and 13 and transfer them to a read/write head may be substantially similar to the processes described in creating and forming an NFT. For example, the heat sinks may be formed on a template/donor substrate using a first, high-temperature process. The first process may involve any of rapid thermal anneal spike annealing, laser annealing, current-induced heating. The first process may involve forming a material stack having of at least two of a heat sink material layer, adhesion layer, protection layer, carrier layer, bonding layer, and chemical mechanical planarization stop material layer. The heat sinks may be formed as islands of the material stack, one of the islands corresponding to the heat sink, and after which the island is transfer printed to the read/write head. The processes may be performed for a plurality of heat sink, such that the plurality of heat sinks is transfer printed to a wafer having a plurality of read/write heads.

Figure 14:
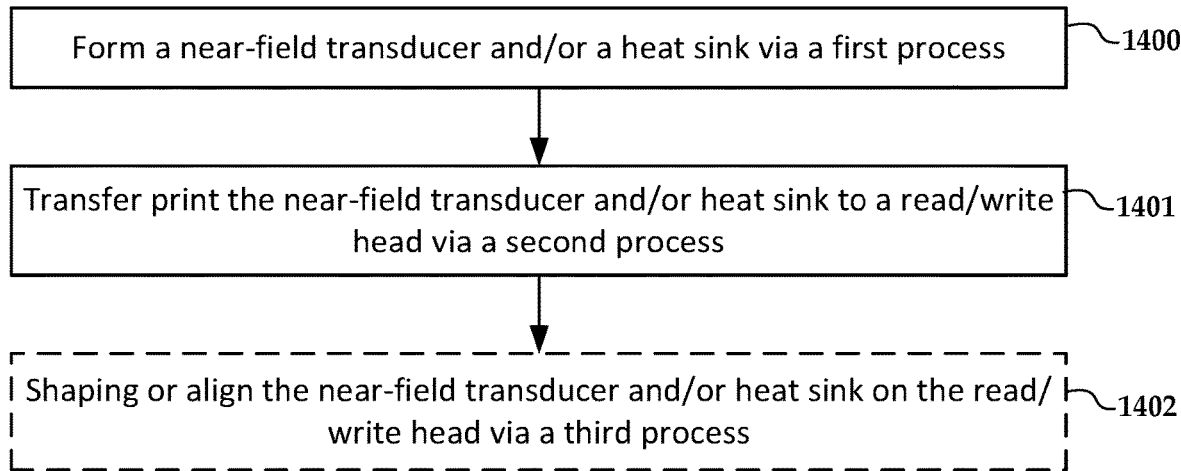
FIGS. 14 and 15 are flowcharts of methods according to example embodiments.

In FIG. 14, a flowchart shows a method according to an example embodiment. The method involves forming 1400 a near-field transducer and/or a heat sink via a first process. The first process may include a high-temperature process, high temperature deposition, rapid thermal anneal spike annealing, laser annealing, current-induced heating, etc. The near-field transducer may include single crystal Au, plasmonic oxide, plasmonic nitride, plasmonic graphene, etc. The heat sink may include diamond, diamond-like carbon, and/or boron nitride. The near-field transducer and/or heat sink is transfer-printed 1401 to a read/write head in a second process. The near-field transducer and/or heat sink may be optionally shaped and/or aligned on the read/write head via a third process (e.g., photolithography). Other processes may be subsequently performed, such as depositing additional material layers (e.g., dielectrics, metals) and shaping the additional material layers to form additional read/write head components.

Figure 15:
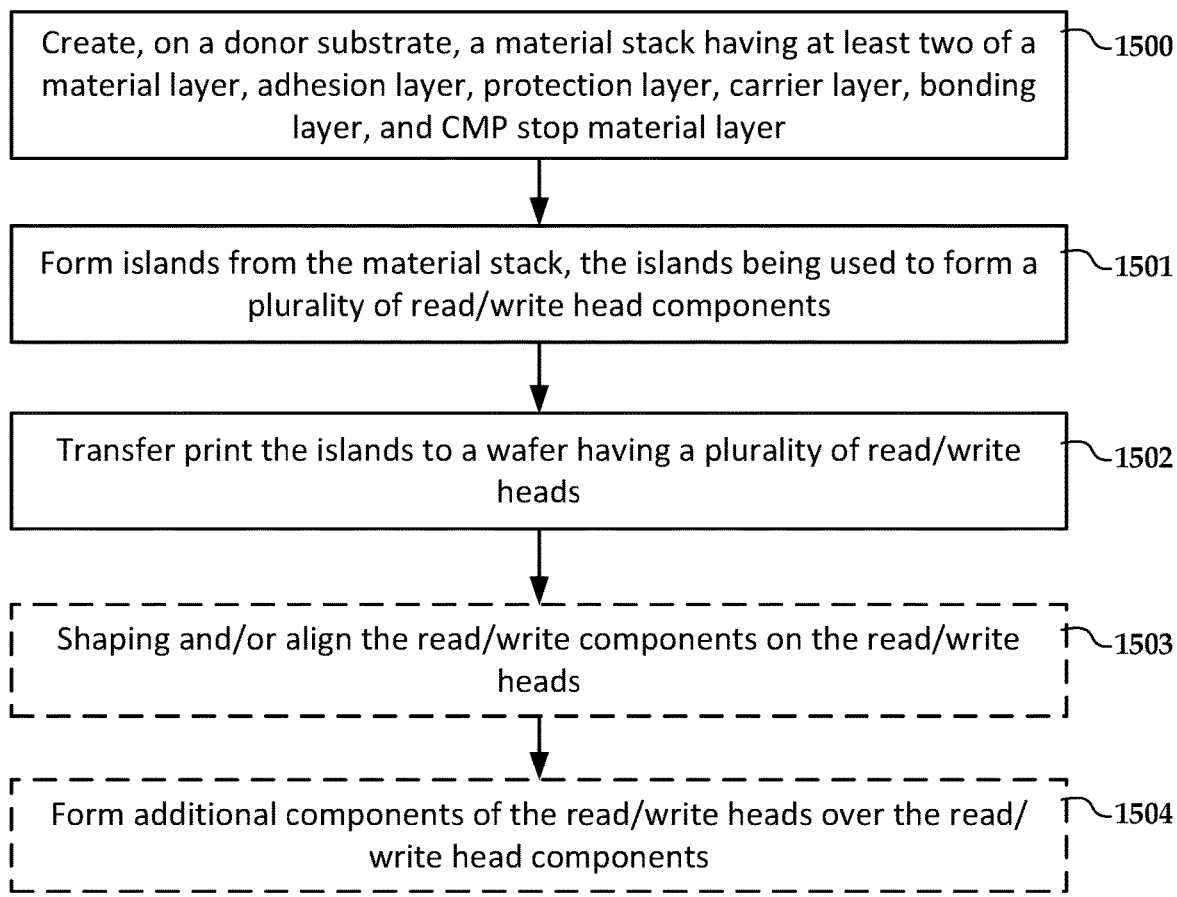

In FIG. 15, a flowchart shows a method according to another example embodiment. The method involves, creating 1500, on a donor substrate, a material stack having at least two of a material layer, an adhesion layer, a protection layer, a carrier layer, a bonding layer, and planarization stop material layer. Islands are formed 1501 from the material stack, the islands being used to form a plurality of read/write head components. The islands are transfer-printed 1502 to a wafer having a plurality of read/write heads.

The method shown in FIG. 15 may optionally include shaping or aligning 1503 the read/write head components on the read/write head after the transfer printing, e.g., using photolithography. The method may further optionally include forming 1504 additional components of the read/write heads over the read/write head components, e.g., using photolithography. Examples of such additional components include read transducers, write transducers, waveguide, bond pads, etc.

Although the subject matter has been described in language specific to structural features and/or methodological acts, it is to be understood that the subject matter defined in the appended claims is not necessarily limited to the specific features or acts described above. Rather, the specific features and acts described above are disclosed as representative forms of implementing the claims.

What is claimed is:

1. A method comprising:
   forming a plurality of non-metallic heat sinks on a layer via a first process, the first process being incompatible with growth on a wafer on which a plurality of read/write heads are formed;
   transfer printing the heat sinks to the plurality of read/write heads via a second process; and
   using photolithography, shaping or aligning the plurality of heat sinks on the read/write heads after the transfer printing.

2. The method of claim 1, wherein the temperature of the first process is between 220 degrees Celsius to 700 degrees Celsius.

3. The method of claim 1, wherein the heat sinks comprises at least one of diamond and diamond-like carbon.

4. The method of claim 1, wherein the first process comprises forming a fully crystalline material on a crystalline substrate.

5. The method of claim 1, wherein the first process comprises forming a material stack comprising of at least two of a plasmonic material layer, adhesion layer, protection layer, carrier layer, bonding layer, and chemical mechanical planarization stop material layer.

6. The method of claim 1, wherein the first process comprises forming a sacrificial layer on a substrate, and forming the heat sinks on the sacrificial layer, and wherein the second process comprises bonding the heat sinks to the wafer and applying a separation force to separate the heat sinks from the sacrificial layer.

7. The method of claim 1, wherein the heat sinks are thermally coupled to magnetic poles of the read/write heads.

8. The method of claim 1, wherein the heat sinks are thermally coupled to optical components of the read/write heads.

9. The method of claim 1, wherein the heat sinks are thermally coupled to read transducers of the read/write heads.

10. The method of claim 1, wherein the heat sinks comprise boron nitride.

11. The method of claim 1, further comprising forming additional components of the read/write heads over the heat sinks.

12. The method of claim 11, wherein the additional components are formed using photolithography.

13. A method comprising:
   forming a plurality of non-metallic heat sinks on a layer via a first process, the first process being incompatible with growth on a wafer on which a plurality of read/write heads are formed;
   transfer printing the heat sinks to the plurality of read/write heads via a second process;
   forming a plurality of near-field transducers of plasmonic material on the layer via the first process; and
   transfer printing the near-field transducers to the wafer together with the heat sinks via the second process.

14. The method of claim 13, wherein the first process comprises forming a sacrificial layer on a substrate, forming the heat sinks on the sacrificial layer, and wherein the transfer printing comprises bonding the heat sinks to the wafer and applying a separation force to separate the heat sinks from the sacrificial layer.

15. A method comprising:
   forming a plurality of non-metallic heat sinks on a layer via a first process, the first process being incompatible with growth on a substrate on which a plurality of read/write heads are formed;
   bonding the plurality of heat sinks to the read/write heads on the substrate via transfer printing;
   forming additional components of the read/write heads over the heat sinks via a process that is compatible with growth on the substrate;
   forming a plurality of near-field transducers on the layer via the first process; and
   bonding the near-field transducers to the substrate together with the heat sinks via the transfer printing.

16. The method of claim 15, wherein the process that is compatible with growth on the substrate comprises photolithography and layer deposition.

17. The method of claim 15, further comprising, using photolithography, shaping or aligning the plurality of heat sinks on the read/write heads after the transfer printing.

18. The method of claim 15, wherein the first process comprises forming a fully crystalline material on a crystalline substrate.

* * * * *